(12) United States Patent
Su

(10) Patent No.: US 9,440,247 B2
(45) Date of Patent: Sep. 13, 2016

(54) SPRINKLER WITH BYPASS TUBE

(71) Applicant: Ho-Chin Chen, Taichung (TW)

(72) Inventor: Shian-Chun Su, Taichung (TW)

(73) Assignee: Ho Chin Chen, Taichung (TW)

( * ) Notice: Subject to any disclaimer, the term of this patent is extended or adjusted under 35 U.S.C. 154(b) by 0 days.

(21) Appl. No.: 14/640,862

(22) Filed: Mar. 6, 2015

(65) Prior Publication Data

US 2016/0221008 A1    Aug. 4, 2016

(30) Foreign Application Priority Data

Jan. 30, 2015    (TW) .............................. 104201458 U

(51) Int. Cl.

| | |
|---|---|
| *B05B 3/16* | (2006.01) |
| *B05B 1/30* | (2006.01) |
| *B05B 1/20* | (2006.01) |
| *B05B 3/12* | (2006.01) |
| *A01G 25/16* | (2006.01) |
| *B05B 9/04* | (2006.01) |
| *B05B 3/02* | (2006.01) |
| *B05B 3/04* | (2006.01) |

(52) U.S. Cl.
CPC ................. *B05B 1/30* (2013.01); *A01G 25/16* (2013.01); *B05B 1/20* (2013.01); *B05B 3/02* (2013.01); *B05B 3/044* (2013.01); *B05B 3/0422* (2013.01); *B05B 3/12* (2013.01); *B05B 9/0423* (2013.01)

(58) Field of Classification Search
CPC ......... B05B 9/0423; B05B 1/30; B05B 1/20; B05B 3/12; B05B 3/02; B05B 3/0422; B05B 3/044; A01G 25/16
USPC .................. 239/225.1, 237, 240, 242, 76
See application file for complete search history.

(56) References Cited

U.S. PATENT DOCUMENTS

| | | | | |
|---|---|---|---|---|
| 4,613,077 A | * | 9/1986 | Aronson ............... | B05B 3/0454 239/240 |
| 4,819,875 A | * | 4/1989 | Beal ...................... | B05B 3/0454 239/240 |
| 7,134,613 B2 | * | 11/2006 | Kah, III ................. | B05B 3/045 239/237 |

* cited by examiner

*Primary Examiner* — Steven J Ganey
(74) *Attorney, Agent, or Firm* — Alan D. Kamrath; Kamrath IP Lawfirm, P.A.

(57) ABSTRACT

A sprinkler includes a base, a positioning collar connected to the base, a gear box connected to the positioning collar and a sprinkling member which is co-rotated with the gear box, and a bypass tube connected between the positioning collar and the sprinkling member. The positioning collar is connected with a hose for introducing water to drive the gear box and the sprinkling member. A portion of the water from the hose enters the bypass tube and is introduced into the other end of the sprinkling tube. The water is introduced into the sprinkling tube from two positions to increase the volume of the water ejected from the sprinkling tube so as to cover a larger area.

7 Claims, 9 Drawing Sheets

US 9,440,247 B2

SPRINKLER WITH BYPASS TUBE

BACKGROUND OF THE INVENTION

1. Fields of the Invention

The present invention relates to a sprinkler, and more particularly, to a sprinkler having a bypass tube which introduces water to enter the other end of the sprinkling member to obtain larger volume water to water a larger area.

2. Descriptions of Related Art

The conventional sprinkler is used to water a larger area by introducing water into the sprinkler, the sprinkler has a rotatable sprinkling member which has multiple holes so that the water ejects out from the holes while the sprinkling member is pivoted. By this arrangement, the water can reach a larger area efficiently.

FIG. 1 discloses a conventional sprinkler which comprises a base 80, a connection port 81 for being connected with a hose, and a diving mechanism 90 connected with the connection port 81. The driving mechanism 90 has a collar 91 and a gear box 92. A sprinkling member 82 has one end connected to the driving mechanism 90, the other end of the sprinkling member 82 is connected to a support on the base 80. Water is introduced into the driving mechanism 90 via the connection portion 81 so as to drive the output shaft 93 of the driving mechanism 90. The output shaft 93 activates the gear sets 94 of the gear box 92. The sprinkling member 82 is driven to be pivoted back and forth relative to the base 80 by the driving mechanism 90 via the gear box 92. The water ejects out from the holes 83 of the sprinkling member 82 to water the lawn.

The water is introduced into the sprinkling member 82 from one direction. When the water flows through the parts in the gear sets 94 of the gear box 92, the water is interrupted and the energy of the water is reduced. Therefore, when the water reaches the holes 83 of the sprinkling member 82, the weak energy of the water cannot reach far distance, and the water volume (A) and the sprinkling area (B) both are limited.

The present invention intends to provide a sprinkler to eliminate the shortcomings mentioned above.

SUMMARY OF THE INVENTION

The present invention relates to a sprinkler and comprises a base having a positioning collar connected thereto. The positioning collar has a connection port which is connected to a hose so as to introduce water into the sprinkler. The positioning collar is connected with a gear box which has a gear reduction unit located therein which is connected with an output gear. A sprinkling member has a first end and a second end. The gear box is connected to the first end of the sprinkling member. The gear box and the sprinkling member are co-rotatable. The gear box has an outlet which communicates with the sprinkling member. A bypass tube has a first end thereof connected with the positioning collar, and a second end of the bypass tube is connected with the second end of the sprinkling member. The water enters the first end and the second end of the sprinkling member via the hose and the bypass tube respectively, and the water ejects from the sprinkling member.

The primary object of the present invention is to provide a sprinkler which has a hose to introduce water into the gear box and the first end of the sprinkling tube. A bypass tube introduces a portion of the water from the hose to be introduced into the other end of the sprinkling tube. Therefore, the power of the water is increased such that sprinkler can deliver the water to a longer distance.

Another object of the present invention is to provide a sprinkler wherein water enters into the sprinkling tube from two different positions. The water that enters the sprinkling tube from the bypass tube does not pass through complicated mechanical parts so as to quickly fill the interior of the sprinkling tube at higher energy and speed. The water can be sent to a farer distance.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
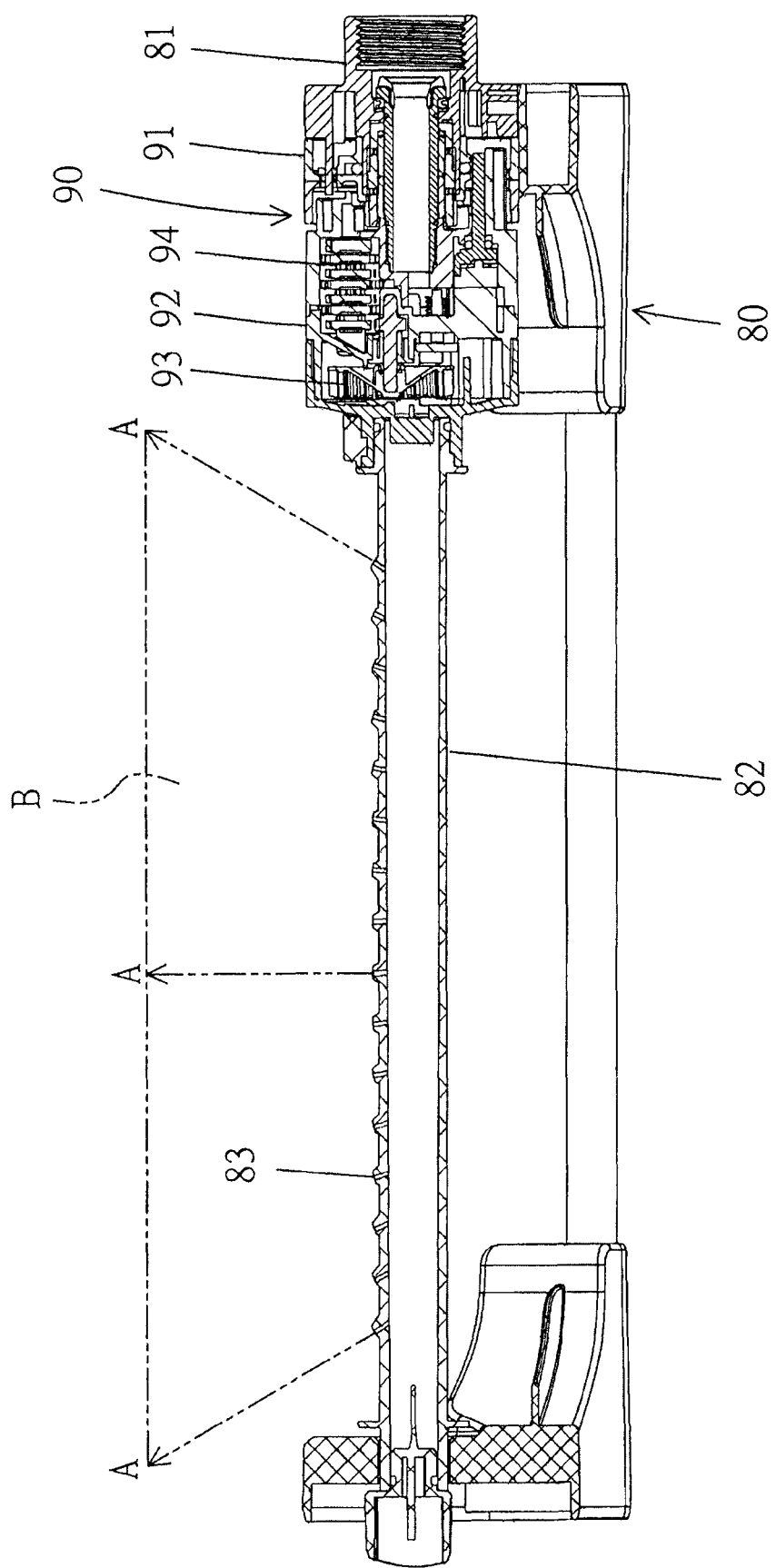
FIG. 1 is a cross sectional view of a conventional sprinkler.
Figure 2:
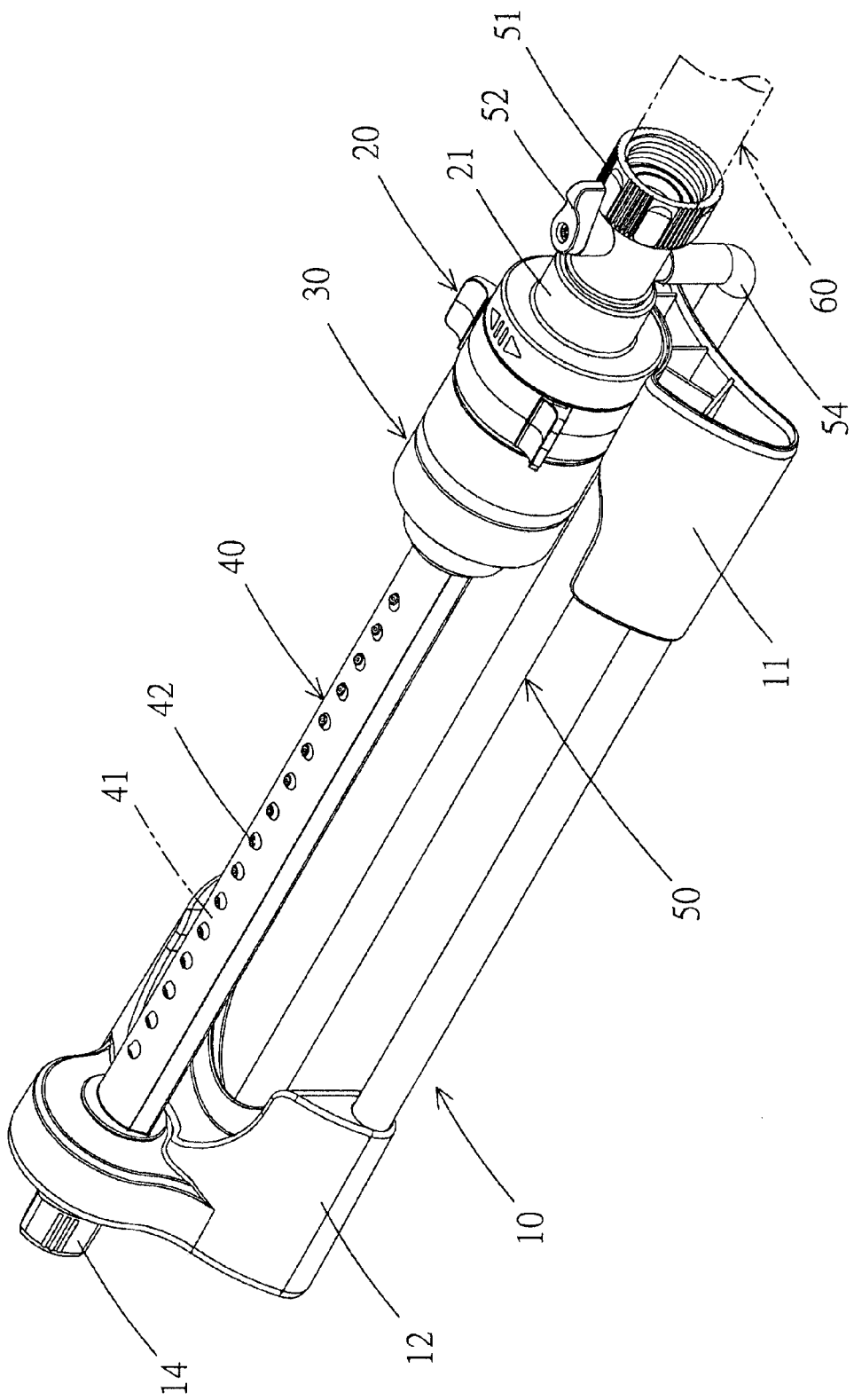
FIG. 2 is a perspective view to show the sprinkler of the present invention.
Figure 3:
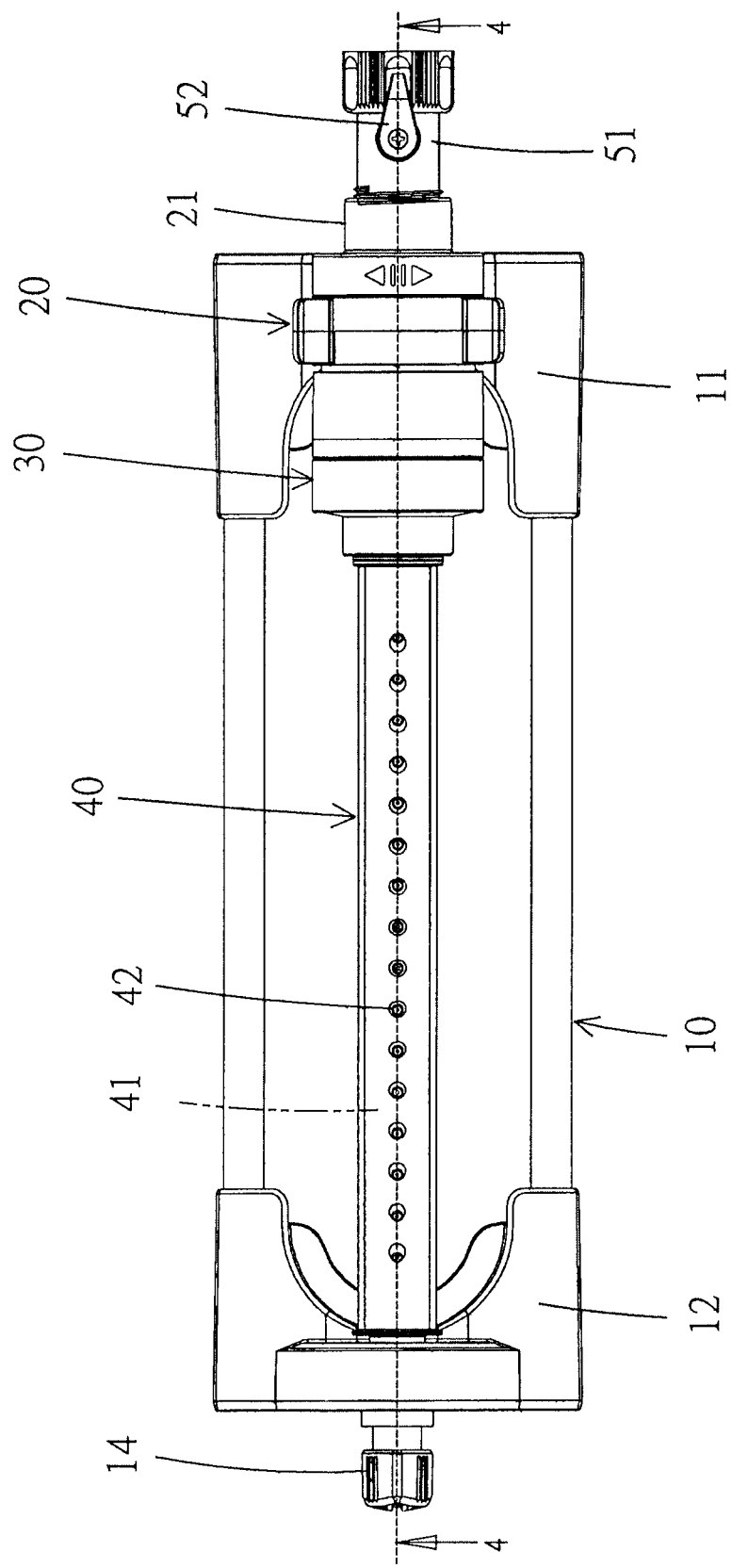
FIG. 3 is a top view of the sprinkler of the present invention.

Referring to FIGS. 2 to 6, the sprinkler comprises a base 10, a positioning collar 20, a gear box 30 and a sprinkling member 40. The base 10 has a first support 11 and a second support 12 located on the top of two ends thereof. The second support 12 has a room 13 defined therein.

Figure 4:
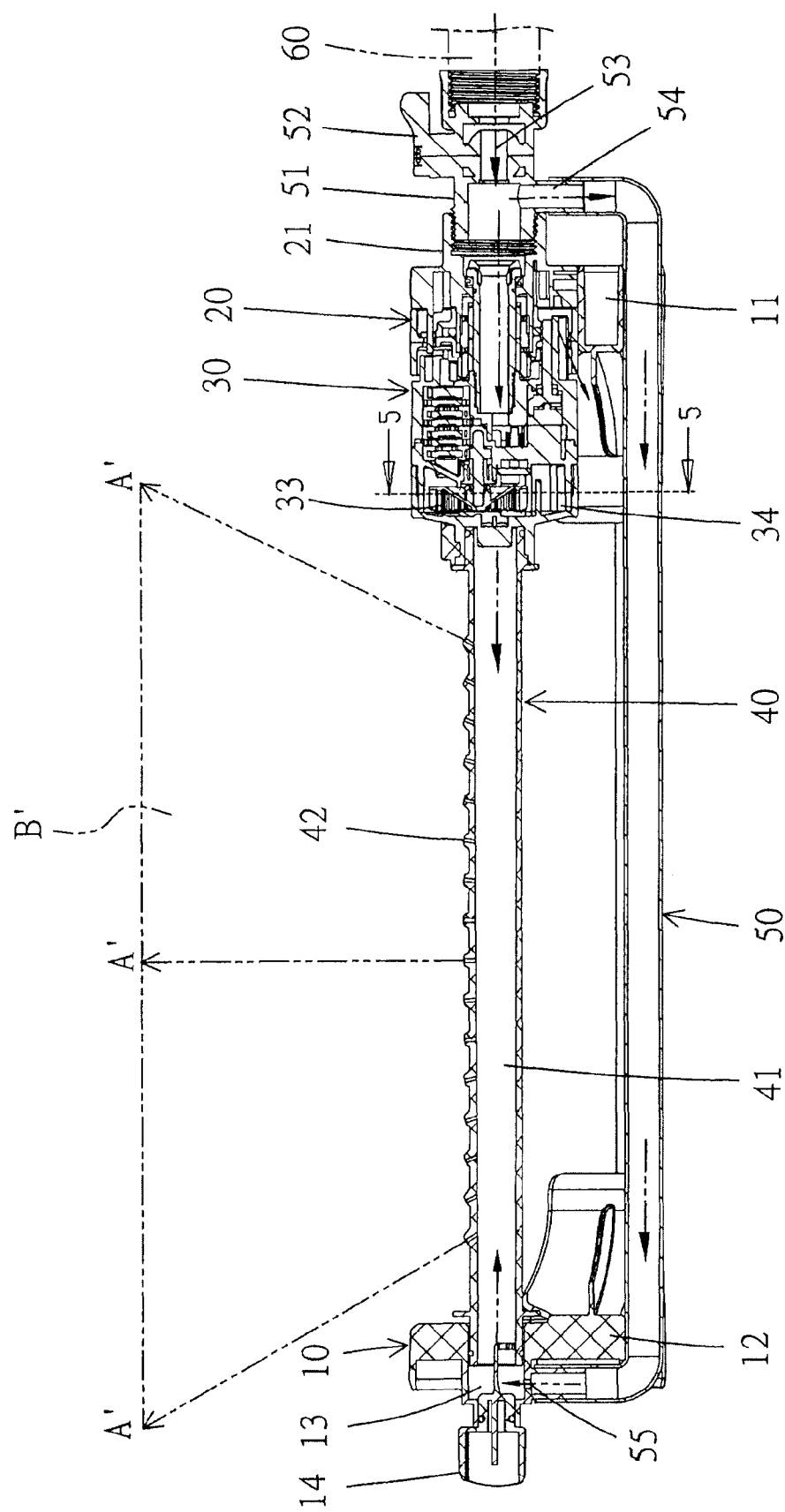
FIG. 4 is a side cross sectional view of the sprinkler of the present invention.
Figure 5:
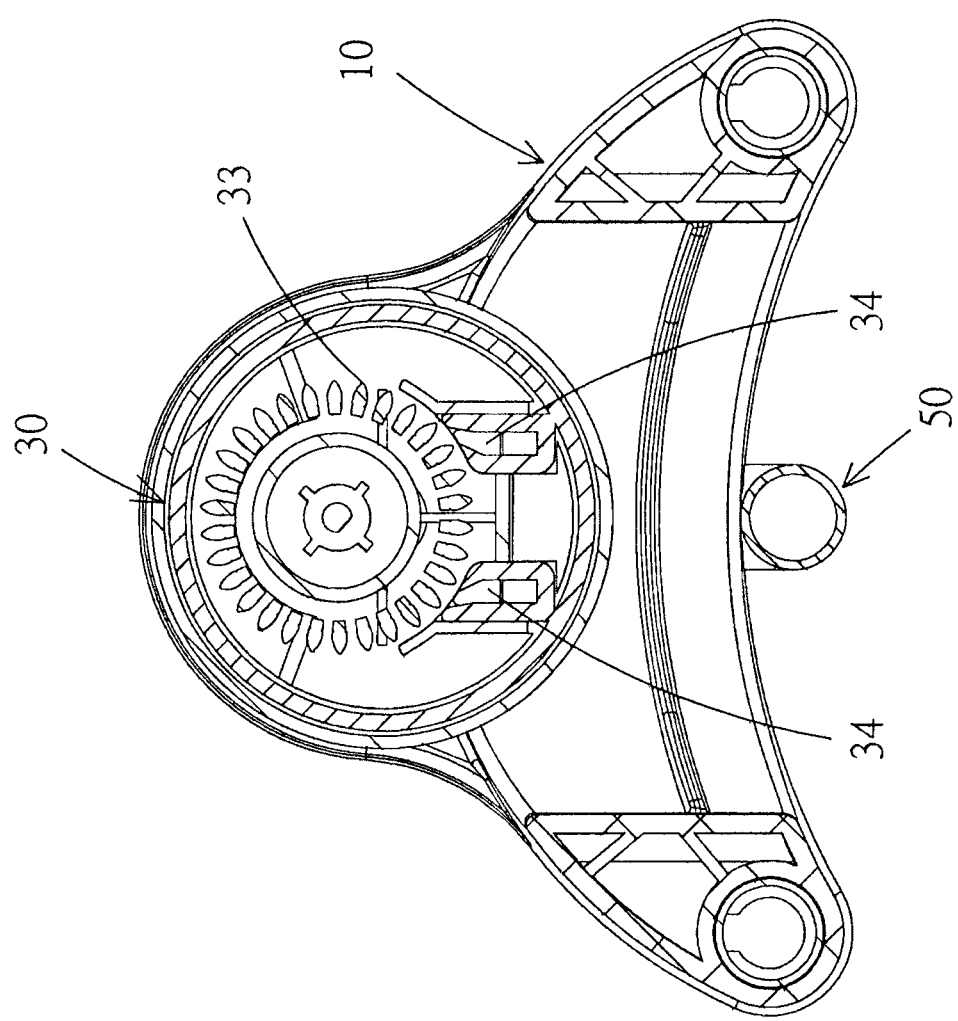
FIG. 5 is an end cross sectional view, taken along line 5-5 in FIG. 4.
Figure 6:
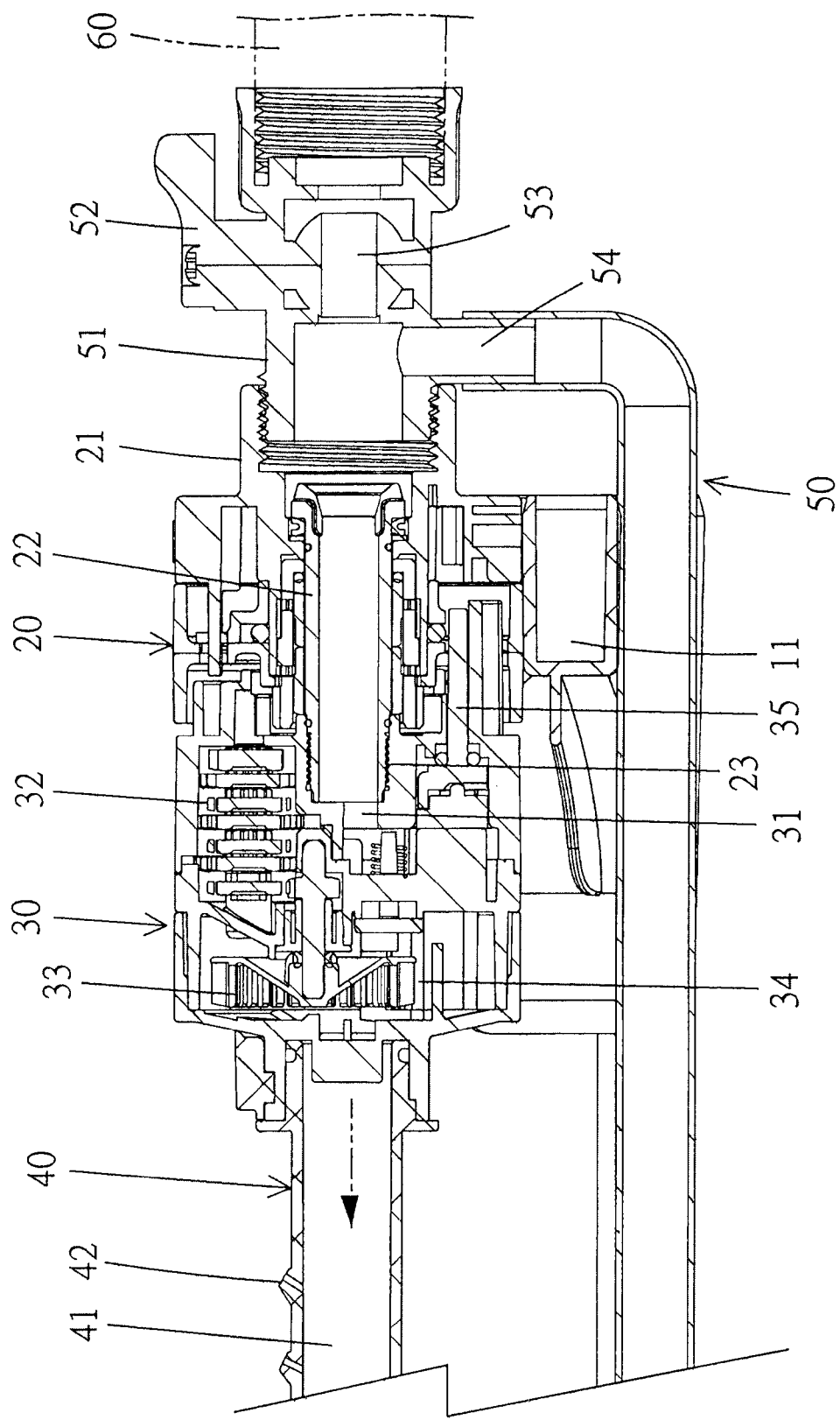
FIG. 6 is a cross sectional view to show the connection of the bypass tube and the valve.

The positioning collar 20 is located on the first support 11 and has a connection port 21 defined in the first end thereof. As shown in FIGS. 4 and 6, the connection port 21 is connected with a vale 51 which is connected with a hose 60 so that water is able to be introduced into the sprinkler from the hose 60. The second end of the positioning collar 20 is connected with a gear box 30. The connection port 21 has a connection pipe 22 connected thereto, and the connection pipe 22 has a fixing end 23 which is connected to the gear box 30. It is noted that the connection pipe 22 and the gear box 30 are co-rotatable. The gear box 30 has a path 31 which co-axially communicates with the connection pipe 22. A gear reduction unit 32 is located in the gear box 30. The water from the hose 60 drives an output gear 33 which is located at one end of the gear box 30, and the output gear 33 drives the gear reduction unit 32. There is a proper reduction ratio existed between the output gear 33 and gear reduction unit 32. The gear box 30 has at least two outlets 34, and water passes through the at least two outlets 34 to drive the output gear 33, such that the gear reduction unit 32 is activated to rotate left and right. Therefore, the gear box 30 and the sprinkling tube 40 are periodically co-rotatable. The angle that the gear box 30 rotates is limited by a restriction rod 35 in the gear box 30.

The sprinkling member 40 has a first end and a second end. The sprinkling member 40 has a passage 41 defined axially therein which communicates with multiple holes 42 defined through the wall of the sprinkling member 40. The first end of the sprinkling member 40 is connected to one of the at least two outlets 34 of the gear box 30, and the second end of the sprinkling member 40 is connected to the room 13 of the second support 12, and an end cap 14 is connected to the second support 12 to seal the room 13. The passage 41 also communicates with the room 13.

The bypass tube 50 has a first end thereof connected with the valve 51, and a second end of the bypass tube 50 is connected with the second end of the sprinkling member 40. A main entrance 53 is defined in valve 51 where the hose 60 is connected. A first entrance 54 is defined through the wall of the valve 51 and communicates with the first end of the bypass tube 50. A second entrance 55 is defined through the wall of the second support 12 and communicates with the second end of the sprinkling member 40 and the room 13. Water enters the first end and the second end of the sprinkling member 40 respectively, and then ejects from the holes 42 of the sprinkling member 40. A control switch 52 is connected to the valve 51 so as to control main entrance 53.

In this embodiment, the diameter of the main entrance 53 is larger than that of the first entrance 54. The diameter of the first entrance 54 is larger than that of the outlet 34. The diameter of the at least two outlets 34 is larger than that of the second entrance 55.

The present invention provides a bypass tube 50 which is connected with a three-way valve 51 which is connected with the connection port 21 of the positioning collar 20 and the hose 60. The valve 51 has a control switch 52 so as to control the water entering into the valve 51. In order to introduce a sufficient volume of water into the gear box 30 so as to drive output gear 33 of the gear box 30, the diameter of the main entrance 53 is larger than that of the first entrance 54, and the diameter of the first entrance 54 is larger than that of the outlet 34. Because of the significant volume of water is introduced, a portion of the water can flow through the bypass tube 50 and enter into the second end of the sprinkling tube 40. The water flows at a speed in the passage 41 of the sprinkling tube 40. The diameter of the at least two outlets 34 is larger than that of the second entrance 55, so that the water ejects from the holes 42 by a higher energy so that the water can be delivered to a longer distance. The volume (A') of the water that ejects from the holes 42 of the sprinkling tube 40 is higher than that of the conventional sprinkler, and the sprinkling area (B') that the sprinkler of the present invention covers is larger than that of the conventional sprinkler as shown in FIG. 4.

Figure 7:
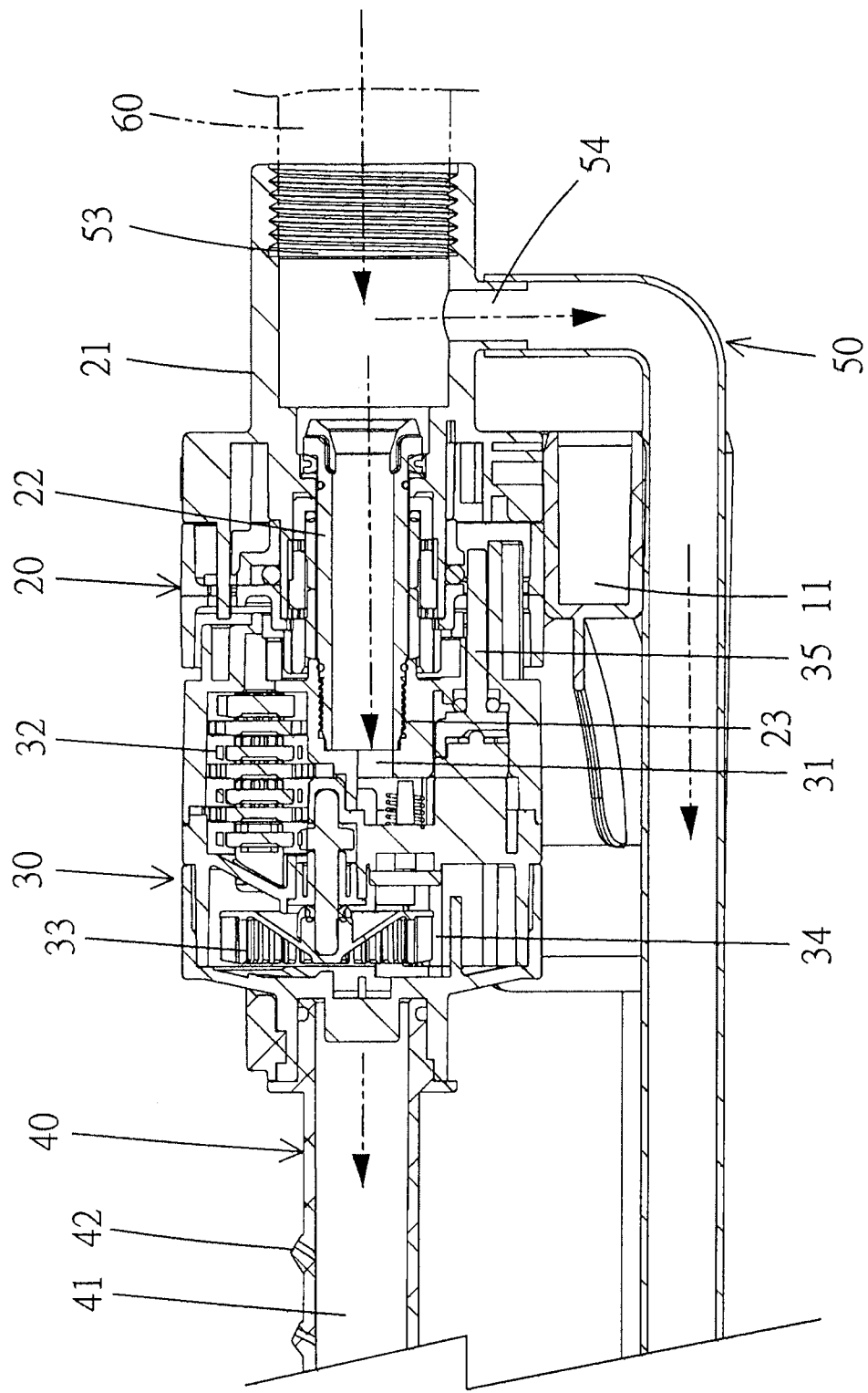
FIG. 7 is a cross sectional view to show the connection of another embodiment of the bypass tube and the valve.

As shown in FIG. 7, another embodiment is disclosed, wherein the valve 51 and the connection port 21 can be made to be a one-piece part which has the main entrance 53 and the first entrance 54. The first end of the bypass tube 50 is connected to the first entrance 54, and the hose 60 is connected to the main entrance 53. The second entrance 55 is formed at the second end of the bypass tube 50, and which is the same as the previous embodiment.

Figure 8:
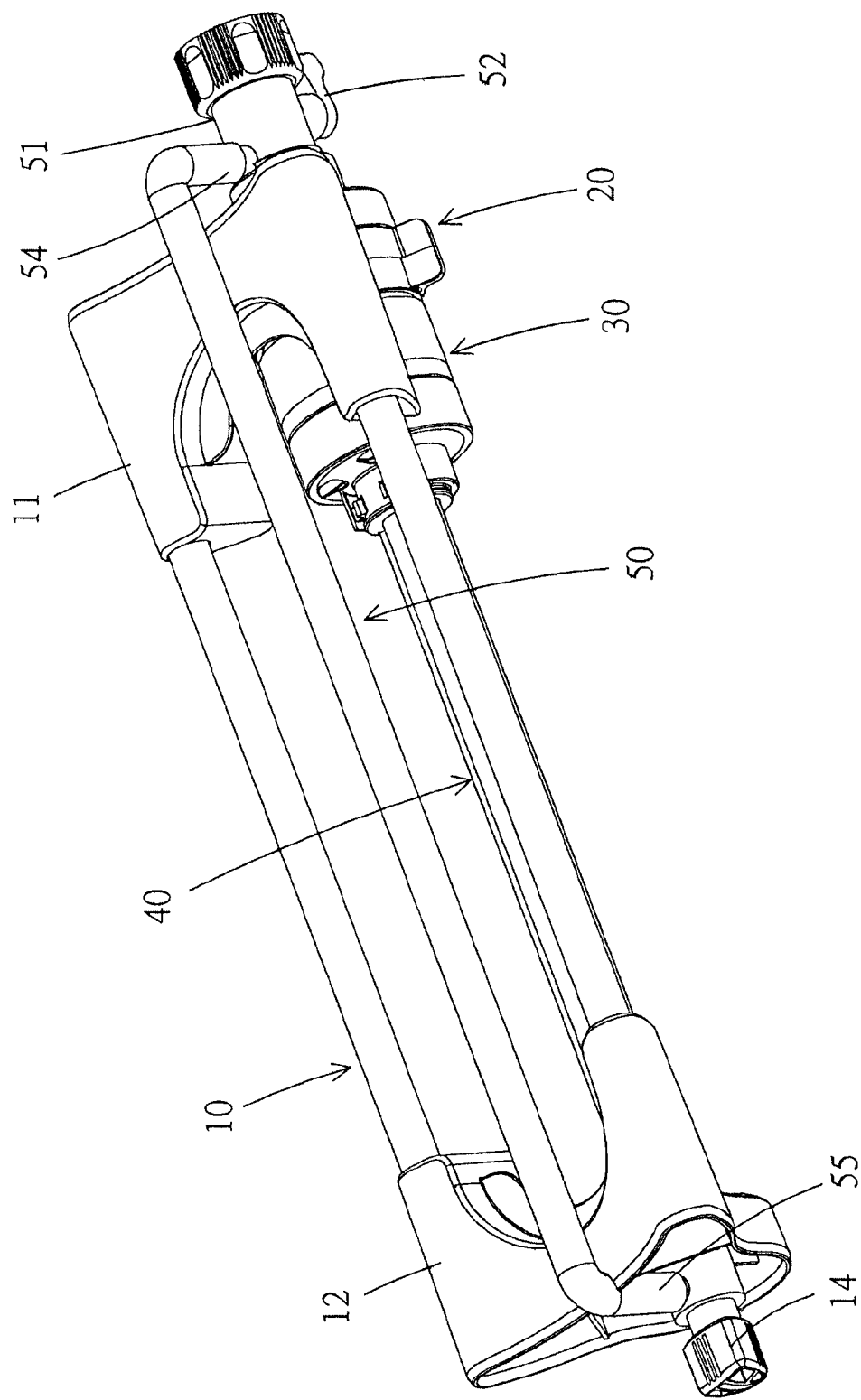
FIG. 8 is a perspective view to show the embodiment of the sprinkler in FIG. 7 of the present invention.

The water is introduced into the valve 51 from the hose 60 and splits into two sub-paths, the water of one sub-path enters the positioning collar 20 via the connection port 21, the connection pipe 22 and the path 31 of the gear box 30. The water drives the output gear 33 and the gear reduction unit 32 which is engaged with the output gear 33, so that the gear box 30 together with the sprinkling member 40 are co-rotated. The water enters the sprinkling member 40 and ejects from the holes 42. The water of the other sub-path enters the passage 41 of the sprinkling member 40 via the first entrance 54 and the second entrance 55. As shown in FIG. 8, thanks to the bypass tube 50, the water simultaneously enters the passage 41 of the sprinkling member 40 from the two ends of the sprinkling member 40 such that the volume and the speed in the passage 41 of the sprinkling member 40 are sufficient, and the area that the water sprinkles is increased.

Figure 9:
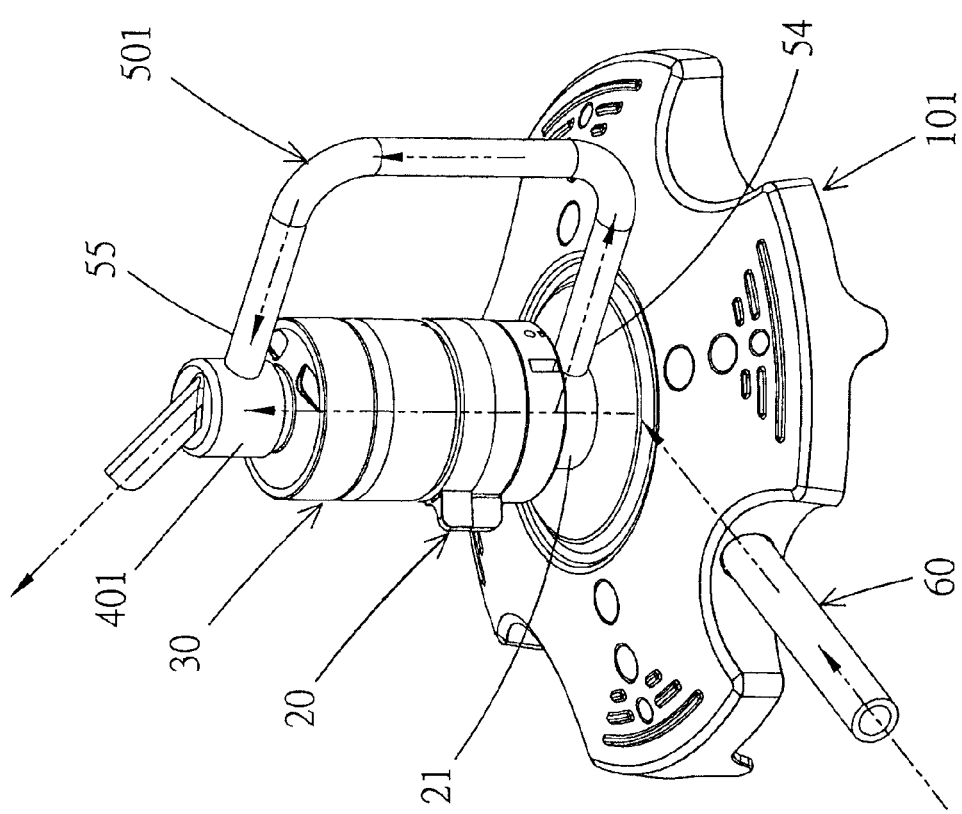
FIG. 9 shows another embodiment of the sprinkler of the present invention.

As shown in FIG. 9, the sprinkler of the present invention can also be used as an upright sprinkler which comprises a base 101 has a positioning collar 20, a gear box 30 and a sprinkling member 401. The positioning collar 20 is located at the center of the base 101. The positioning collar 20 has a connection port 21 for being connected to a hose 60. A soft bypass tube 501 is connected between the sprinkling member 401 and the connection port 21. The water introduced from the hose 60 flows into the gear box 30 and the bypass tube 501, such that the gear box 30 and the sprinkling member 401 are co-rotatable. The water enters into the sprinkling member 401 from two positions thereof so as to cover a larger sprinkling area. The sprinkling member 401 has one hole defined in the distal end thereof so that water ejects from the hole of the sprinkling member 401.

While we have shown and described the embodiment in accordance with the present invention, it should be clear to those skilled in the art that further embodiments may be made without departing from the scope of the present invention.

What is claimed is:

1. A sprinkler comprising:

a base having a positioning collar connected thereto, the positioning collar having a connection port defined in a first end thereof, the connection port connected with a valve which is adapted to be connected to a hose, the positioning collar connected with a gear box which has a gear reduction unit located therein which is connected with an output gear, the base having a first support and a second support respectively located on a top of two ends thereof, the positioning collar located on the first support, a second end of the positioning collar connected with the gear box;

a sprinkling member having a first end and a second end, the sprinkling member having multiple holes defined through a wall thereof, the gear box connected to the first end of the sprinkling member, the gear box and the sprinkling member being co-rotatable, the gear box having at least one outlet which communicates with the sprinkling member, and a bypass tube having a first end thereof connected with the valve, a second end of the bypass tube connected with the second end of the sprinkling member, a main entrance defined in the valve and adapted to communicate with the hose connected to the valve, a first entrance defined through a wall of the valve and communicating with the first end of the bypass tube, a second entrance defined through a wall of the second support and communicating with the second end of the sprinkling member, water entering the first end and the second end of the sprinkling member respectively, and ejecting from the holes of the sprinkling member.

2. The sprinkler as claimed in claim 1, wherein a diameter of the main entrance is larger than that of the first entrance.

3. The sprinkler as claimed in claim 1, wherein a diameter of the first entrance is larger than that of the outlet.

4. The sprinkler as claimed in claim 1, wherein a diameter of the outlet is larger than that of the second entrance.

5. The sprinkler as claimed in claim 1, wherein the second support has a room defined therein and the second end of the sprinkling member communicates with the room, the second entrance communicates with the room.

6. The sprinkler as claimed in claim 5, wherein the sprinkling member has a passage defined axially therein which communicates with the holes, the room and the second entrance.

7. The sprinkler as claimed in claim 1, wherein a control switch is connected to the valve so as to control main entrance.

* * * * *